(12) United States Patent
Heo (10) Patent No.: US 6,563,840 B1
(45) Date of Patent: May 13, 2003

(54) BROADCAST MESSAGE TRANSMITTING AND RECEIVING METHOD IN A MOBILE COMMUNICATION SYSTEM

(75) Inventor: Cheol Kyun Heo, Kyungki-do (KR)

(73) Assignee: LG Information & Communication, Ltd., Seoul (KR)

( * ) Notice: Subject to any disclaimer, the term of this patent is extended or adjusted under 35 U.S.C. 154(b) by 0 days.

(21) Appl. No.: 09/223,769

(22) Filed: Dec. 31, 1998

(30) Foreign Application Priority Data

Mar. 25, 1998 (KR) .............................. 98-10328

(51) Int. Cl.⁷ ................................. H04J 3/26
(52) U.S. Cl. ....................... 370/474; 370/432
(58) Field of Search ................. 370/474, 389, 370/395, 252, 254, 326, 468, 522, 314, 324, 535, 536, 476, 465, 395.1, 442, 441, 347, 394, 432; 455/3.2, 12.1, 427, 13.2, 445, 560, 517, 554, 555, 524, 428, 432, 435

(56) References Cited

U.S. PATENT DOCUMENTS

| | | | | |
|---|---|---|---|---|
| 5,799,012 A | * | 8/1998 | Ayerst et al. | 370/473 |
| 6,144,653 A | * | 11/2000 | Persson et al. | 370/337 |
| 6,161,016 A | * | 12/2000 | Yarwood | 455/445 |
| 6,201,798 B1 | * | 3/2001 | Campanella et al. | 370/326 |
| 6,310,892 B1 | * | 10/2001 | Olkin | 370/473 |
| 6,400,727 B1 | * | 6/2002 | Lim et al. | 370/473 |

\* cited by examiner

Primary Examiner—Dang Ton
(74) Attorney, Agent, or Firm—Fleshner & Kim, LLP (57) ABSTRACT

This invention relates to the methods for transmitting and receiving the broadcast message in a mobile communication system. According to the present invention, the broadcast message is appropriately decomposed into the predetermined number of messages at a base station according to the load of a paging channel and to the size of the broadcast message. The decomposed broadcast messages are successively transmitted to a mobile station through the paging channel. The mobile station receives successively the decomposed broadcast messages in the decomposed order and forms a single broadcast message by arranging the received decomposed broadcast messages. For the decomposing process and the receiving process, two broadcast address parameters are added to the existing parameters.

20 Claims, 6 Drawing Sheets

| Field | Length(bits) |
|---|---|
| PRIORITY | 2 |
| MESSAGE_ID | 6 |
| ZONE_ID | 8 |
| SERVICE | 16 |
| LANGUAGE | 8 |

Fig. 5
Background Art

| Subparameter | Type |
|---|---|
| message identifier | selection |
| user data | selection |
| SCM time stamp | selection |
| absolutely available period | selection |
| relatively available period | selection |
| priority indicator | selection |
| message delivery | selection |
| language indicator | selection |

FIG. 6

| Field | Length(bits) |
|---|---|
| SEG_CNT | 2 |
| SEG_SEQ | 2 |
| RESERVED | 4 |

BROADCAST MESSAGE TRANSMITTING AND RECEIVING METHOD IN A MOBILE COMMUNICATION SYSTEM

BACKGROUND OF THE INVENTION

The present invention relates to a method of transmitting and receiving broadcast message in a communication system.

Generally, in the service of a mobile communication system like CDMA, the broadcast message service which is provided to the subscribers of the service is provided to the mobile terminal (or a mobile station) of the subscribers through paging channels and traffic channels.

There are three methods for transmitting the broadcast message by said paging channels. The first is a multi-slot broadcast transmission method which sends the broadcast message to all slots of a control channel so as to send the broadcast message by using all the mobile terminals which are located in the service area of a base station. This is the simple and fast method having no time delay in the message. However, this method gives a large load to the control channel and makes the process of the other message impossible. The second is a multi-slot broadcast paging method. This method is one kind of the improved multi-slot transmission methods and transmits the broadcast message after informing all the terminals of the broadcasting by transmitting the general paging messages with small size instead of large to all slots of the control channel. The third is a periodic broadcast paging method that is provided by mobile communication service companies. This method decides the on/off of the transmission service of the broadcast message and the period of the broadcast message by the broadcast index of the field in the extend system parameter message among the added service information messages that are transmitted by the base station, and transmits periodic broadcast messages according to the period.

Among the above three methods, the periodic broadcast paging method is the most effective one and informs the terminals of the fact that the base station is going to transmit periodically the broadcast messages. Thereafter, when a defined period is passed, this method transmits the broadcast message. The first slot of the period of which is informed to all terminals is called the reference slot. The general paging message including the broadcast address of the message that will be transmitted in the future is transmitted to this reference slot. From this broadcast address information, the terminals decide the type of the message, the arrival time of the message and whether the message is to be accepted or not. The broadcast message corresponding to each broadcast address must be transmitted by the period of three slots after the reference slot.

Figure 1:
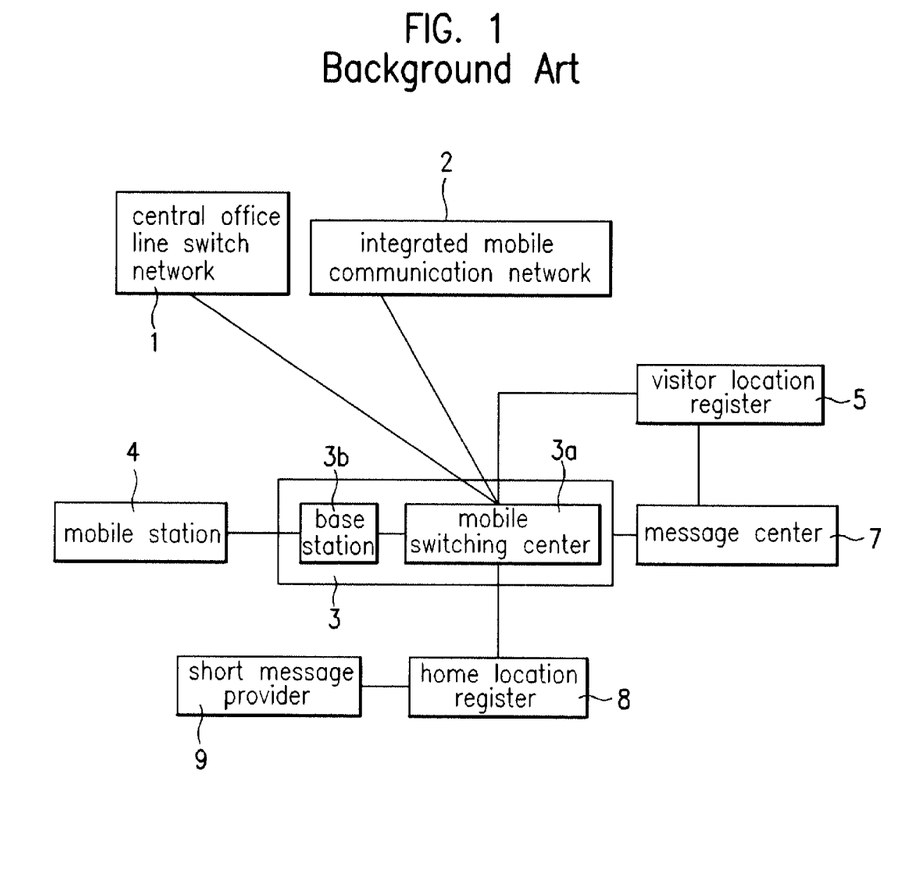
FIG. 1 is a block diagram showing the network structure of a conventional CDMA system.

FIG. 1 is a block diagram showing the network structure of a general CDMA system.

Referring to FIG. 1, the mobile communication service using basically the CDMA system provides radio or wireline communication to the mobile communication subscribers by using the public switch telephone network(PSTN) (1) for the general telephone subscribers, which is provided by the communication network agent, and the integrated service digital network(ISDN) (2) providing communication service for both voice and data by a digital subscriber line.

Figure 2:
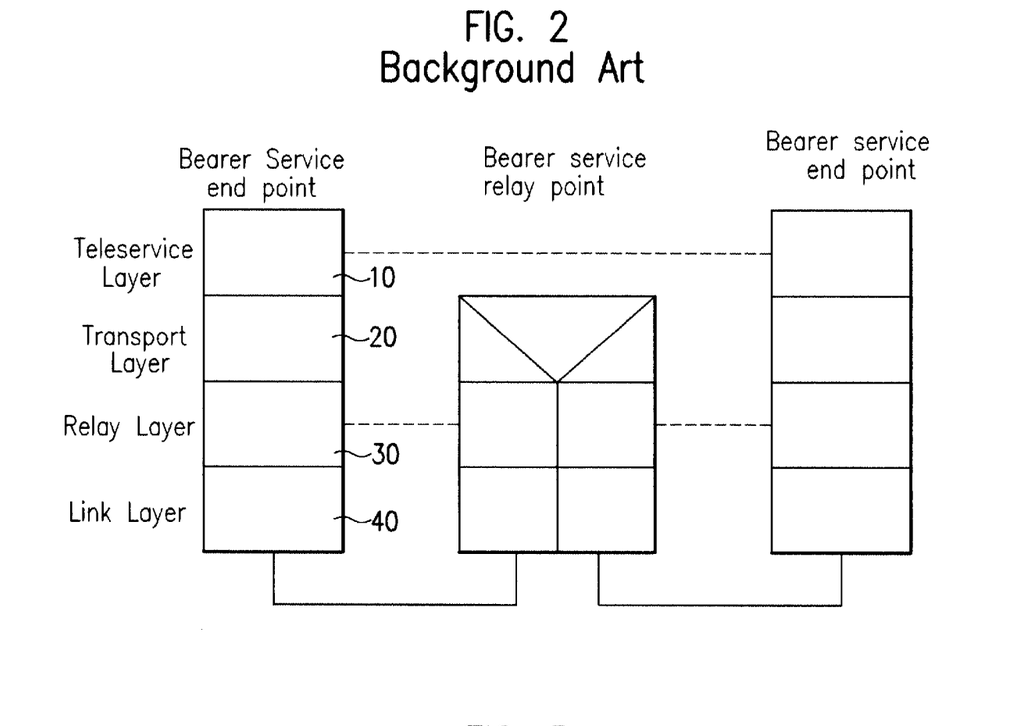
FIG. 2 is a diagram showing a structure of the protocol stack used in the service of the broadcast short message.
Figure 3:
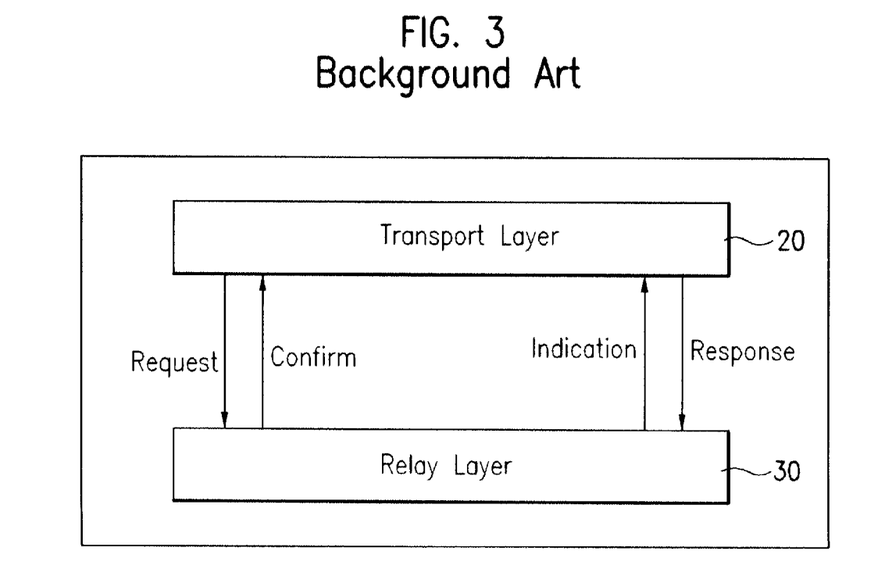
FIG. 3 is a diagram showing the primitive type of between the relay layer and the transport layer in the protocol stack used in the broadcast short message.

A mobile switching center (MSC) (3a) performs a circuit switching and a transit paging processing so that the subscriber is able to communicate with other mobile subscribers or general wireline subscribers by the mobile communication service, performs the functions of hand-off and roaming in order to provide a good quality of a communication service, and performs transport layer for the broadcast message transmission (20 in FIGS. 2 and 3).

Furthermore, the base station (3b) is connected with the mobile station (4), which is either in a geostationary position or in moving, by the radio traffic path. Therefrom, the base station (3b) connects the mobile station with the device performing the base station control by radio or wireline path and performs the relay layer (30 in FIGS. 3 and 4) for the broadcast message transmission.

Furthermore, the base station contains the information about various kinds of mobile communication connected with the mobile switching center. Therefore, the base station also contains the current position information of the mobile station (4), the state of the mobile communications subscribers, the statistical data about the mobile communication and the information concerning to various services. There are also the home location register (6) to be connected with radio/wireline subscribers and the visitor location register (5) to be connected with the mobile switching center (3) in order to search the information for processing the paging from other network subscribers.

Figure 4:
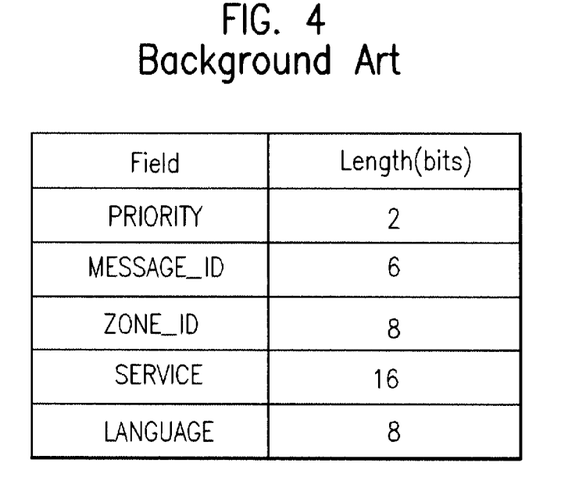
FIG. 4 is a table showing the general field parameters of the broadcast address for the transmission of the broadcast message.

A cell broadcast center (7) which is an important element in the broadcast message transmission takes charge of the teleservice layer (10 in FIGS. 3 and 4). The short message entity (8) provides the broadcast message to said cell broadcast center (7).

The mobile communication service process of the basic network of the CDMA system in FIG. 1 is omitted and only the transmission service for the broadcast message will be explained here.

Referring to FIG. 1, a communication network agent selects one of the three broadcast message transmission methods by the paging channels previously described.

A short message provider (8) sends the broadcast message which will be transmitted to the cell broadcast center (7) which takes charge of the teleservice layer (10). The broadcast message received by the cell broadcast center (7) is transmitted to the mobile station (4) through the mobile switching center (3a) which takes charge of the transport layer (20) and the base station (3b) which takes charge of the relay layer (30) shown in FIGS. 2 and 3.

Said base station (3b) makes said broadcast message contents included in the data burst message and transmits it to the mobile station (4) through the paging channel by said selected broadcast message transmission method.

The multi-slot broadcast transmission method uses the data burst message. The multi-slot broadcast paging method and the periodic broadcast paging method use a general paging message.

The address field in the data burst message or the general paging message is filled with the broadcast address which is the address not the inborn address of the mobile station (4) but for the broadcast message transmission. According to this broadcast address, it is decided whether or not the broadcast message is received.

FIG. 4 shows the broadcast address for the broadcast message transmission in a conventional system. This address consists of two bit priority bits (PRIORITY), six bit message identification bits (MESSAGE_ID), eight bit zone identification bits (ZONE_ID), sixteen bit service bits (SERVICE) and eight bit language bits (LANGUAGE).

The broadcast address will be explained as follows. The two bit priority bits (PRIORITY) are to determine the priority of the broadcast messages to be broadcast when a plurality of broadcast messages are transmitted.

The six bit message identification bits (MESSAGE_ID) are to decide whether or not the current broadcast message is a duplicate copy of the message which has already been transmitted in order to avoid a duplicate transmission.

The 8 zone bits (ZONE_ID) are to discriminate an identical message received from a plurality of zones different from each other.

The 16 service bits (SERVICE) are used to classify the broadcast message transmission services by their items. The 8 language bits (LANGUAGE) are used as language indicator bits for the classification of the languages used for the broadcast message.

FIG. 2 shows the protocol stack structure for the broadcast message transmission service.

The link layer (40) in the lowest level is a protocol layer for establishing the connection of communication circuit for the communication service.

Relay layer (30) belonged to the base station (3b) of FIG. 1 is a protocol layer to discard, when broadcast messages having an identical broadcast address are received overlapping in time within a broadcast period, the overlapping message. Relay layer (30) also takes charge of the communication path allocation, the address establishment and release.

Transport layer (20) belonged to the mobile switching center (3a) is a protocol layer for the broadcast message transmission between the cell broadcast center (7) and the base station (3b) and takes charge of the paging connection management, data classification and data flow control.

Teleservice layer (10) belonged to the cell broadcast center (7) is a protocol layer to provide the broadcast message transmission service by broadcast message subparameters.

In order to transmit the broadcast message provided by the broadcast message subparameters of the teleservice layer (10), the transmission of the broadcast message is achieved by the parameters provided from the transport layer (20), the relay layer (30) and the link layer (40) which are the protocol layers lower than the teleservice layer (10).

Figure 5:
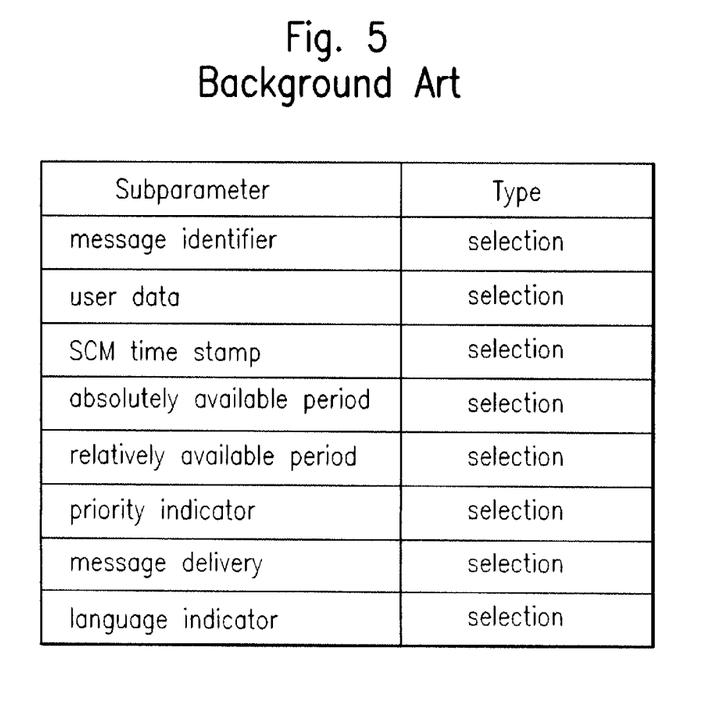
FIG. 5 is a table showing the subparameters of the broadcast message.

FIG. 5 shows the broadcast message subparameters of said teleservice layer (10). All the subparameters may be used selectively and generally include a message identifier, a user data, a SMC type stamp, an absolute availability period, a relative availability period, a priority indicator, a message delivery notice, and a language indicator.

FIG. 3 shows the primitive type of the relay layer (30) and the transport layer (20) in the structure of the protocol stack.

There are 4 steps in the primitive between said two layers which are a request step requesting the processing of an arbitrary work, an indication step informing of said requested work, a response step responding to said informed work, and a confirm step confirming the response to the request.

The relationship between the relay layer (30) and the transport layer (20) by the primitive is explained as follows.

After the request step requesting the broadcast message transmission in the transport layer (20), said relay layer (30) sends an indication to the transport layer (20) to inform of the broadcast message transmission. At this time, the transport layer (20) sends a response indicating whether or not allowing the broadcast message transmission.

To the response signal, the transport layer (20) performs said broadcast message transmission by the confirm step of the relay layer (30).

In the broadcast message transmission method according to the conventional arts described beforehand, a paging channel transmitting said broadcast message has a slot whose maximum length is 96 bytes. Except for header of the paging channel and error rate control bit (CRC), the length of the slot for transmitting the practical broadcast message is 80 bytes. However, the length of the broadcast message needs one to three slots.

Thus, the length of the slot for the broadcast message of the paging channel is limited to 80 bytes. Therefore, the following problems spring up.

First, if the broadcast message is practically transmitted to one slot, enough contents cannot be transmitted by the message and therefore the service is impossible.

Second, the size of the data being transmitted by the paging channel as a control channel is generally fixed. However, it a large amount of message is required to be transmitted, a bottle neck occurs. Hence, only when a successive space having enough size for transmitting the message is prepared by a transmission specialty, the broadcast message transmission is possible. However, since the size of the broadcast message is larger than that of the paging message, it is difficult to secure enough space when a large amount of paging message is transmitted.

Third, when the broadcast message having the size of two or three slots is transmitted through the paging channel, the size of the message is too large and the probability with which the paging message for a general call processing is not transmitted increases. Furthermore, the quality of the service for the general call processing decreases.

Fourth, if the priority is given to the paging message and then the paging message is transmitted in order to protect the service quality of the general call from decreasing, the broadcast message does not secure so much space as it needs and therefore all the message cannot be transmitted and the broadcast service is impossible.

SUMMARY OF THE INVENTION

Accordingly, the present invention is directed to provide a broadcast message transmitting and receiving method in a communication system regardless of the load of a paging channel.

Another object of the present invention is to provide a broadcast message transmitting and receiving method in a communication system whose paging channel operates in a good stability and a good efficiency by distributing the instantaneous load of the paging channel Another object of the present invention is to provide a broadcast message transmitting and receiving method in a communication system whose paging channel is in a stable operation as well as transmits a large amount of broadcast message.

To achieve these and other advantages and in accordance with the purpose of the present invention, as embodied and broadly described, the present invention makes it possible that a single broadcast message received from a cell broadcast center is decomposed into the predetermined maximum number of decomposition in a base station and each decomposed broadcast message is transmitted to a mobile station. Therefore, in the case that there is not a successive space having a sufficient size on the paging channel, the decomposed message as much as the empty space appearing on the paging channel at the corresponding time is discretely transmitted to the mobile station. The method according to the present invention includes the step decomposing the broadcast message into a plurality of messages whose size is not larger than the maximum decomposition number according to the load of the paging channel and the size of the broadcast message in a base station, the step transmitting sequentially the decomposed broadcast messages to the base station through the paging channel, the step receiving sequentially the decomposed broadcast messages by the mobile station, and the step obtaining a single broadcast message by connecting the sequentially received broadcast messages.

In order to implement this method, a segment count parameter (SEG-CNT) and asegment sequence parameter (SEG-SEQ) are used. Each decomposed broadcast message in said steps has its own broadcast address and each broadcast address has said two parameters. When a single broadcast message is decomposed into the predetermined number of messages, the segment count parameter (SEG-CNT) of each broadcast address is filled with the number by which the broadcast message is decomposed. The segment sequence parameter (SEG-SEQ) of each broadcast address is filled with the numbers from the minimum number to the maximum number in the decomposed sequence. The information about the segments is written in the broadcast address field of the broadcast page and the broadcast page is written in the reference slot which is the first of the slots to be transmitted on the paging channel. On the other hand, the mobile station monitors this reference slot and decides the broadcast message and its location to receive by the information of the broadcast address included in the reference slot. Therefore, the transmission of a large amount of broadcast message is possible regardless of the load of the paging channel and it is possible to effectively use the paging channel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

For the explanation of the present invention, figures used for the conventional techniques will be used.

The present invention is applied to the third method of the three conventional broadcast message transmission methods. The method of the present invention is to decompose a single broadcast message into a plurality of message units in the base station and to transmit the decomposed messages in sequence to the mobile station. Therefore, if there is no successive space having a sufficient size for transmitting a plurality of the messages at the same time, the amount of message as much as the empty space that is generated at the corresponding time is transmitted from the base station to the mobile station by the priority order. The number of the decomposed message units is determined by the load capacity of the corresponding paging channel.

Since the network structure of the CDMA communication system for implementing the broadcast message transmission method according to the present invention is the same as the conventional system, the process for the contents of the broadcast message to be included in the data burst message at the base station (4) of FIG. 1 and the process for the message to be transmitted by the corresponding paging channel, the process for the messages to be transmitted through the paging channel and the process for the general page message to be transmitted will be omitted. However, first, the address format of the broadcast message to be included into the data burst message or the general paging message is explained as follows.

In the present invention, the address format of the conventional broadcast message described in FIG. 4 is used as it is. However, a format for the broadcast address field shown in FIG. 6 is added to the conventional address format.

FIG. 4 is explained beforehand. Therefore, the explanation about FIG. 6 will be done.

Figure 6:
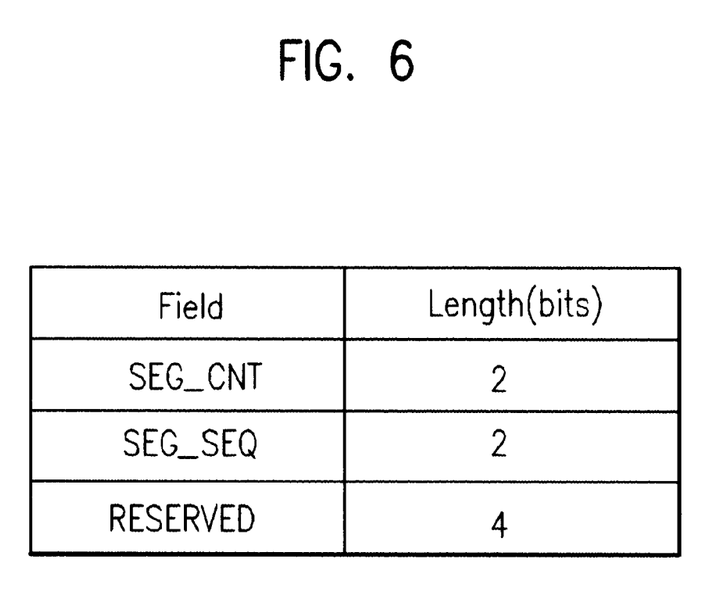
FIG. 6 is a table showing the field parameters of the additional broadcast address according to the present invention.

Referring to FIG. 6, the field parameter (SEG-CNT) indicates the segmentation count field and the field parameter (SEG-SEQ) indicates the segmentation sequence field. Furthermore, the field parameter (RESERVED) has a reserve bit length. As shown in FIG. 6, the length of one byte is required for the broadcast address field added according to the present invention. The parameter (SEG-CNT) has a two bit length and the parameter (SEG-SEQ) a two bit length. On the other hand, the reserve parameter (RESERVED) has s four bit length.

Hence, referring FIG. 7, it will be explained that the broadcast message is decomposed by using the field parameters (SEG-SEQ, SEG-CNT) in the base station and the decomposed messages are transmitted to the corresponding mobile station.

Figure 7:
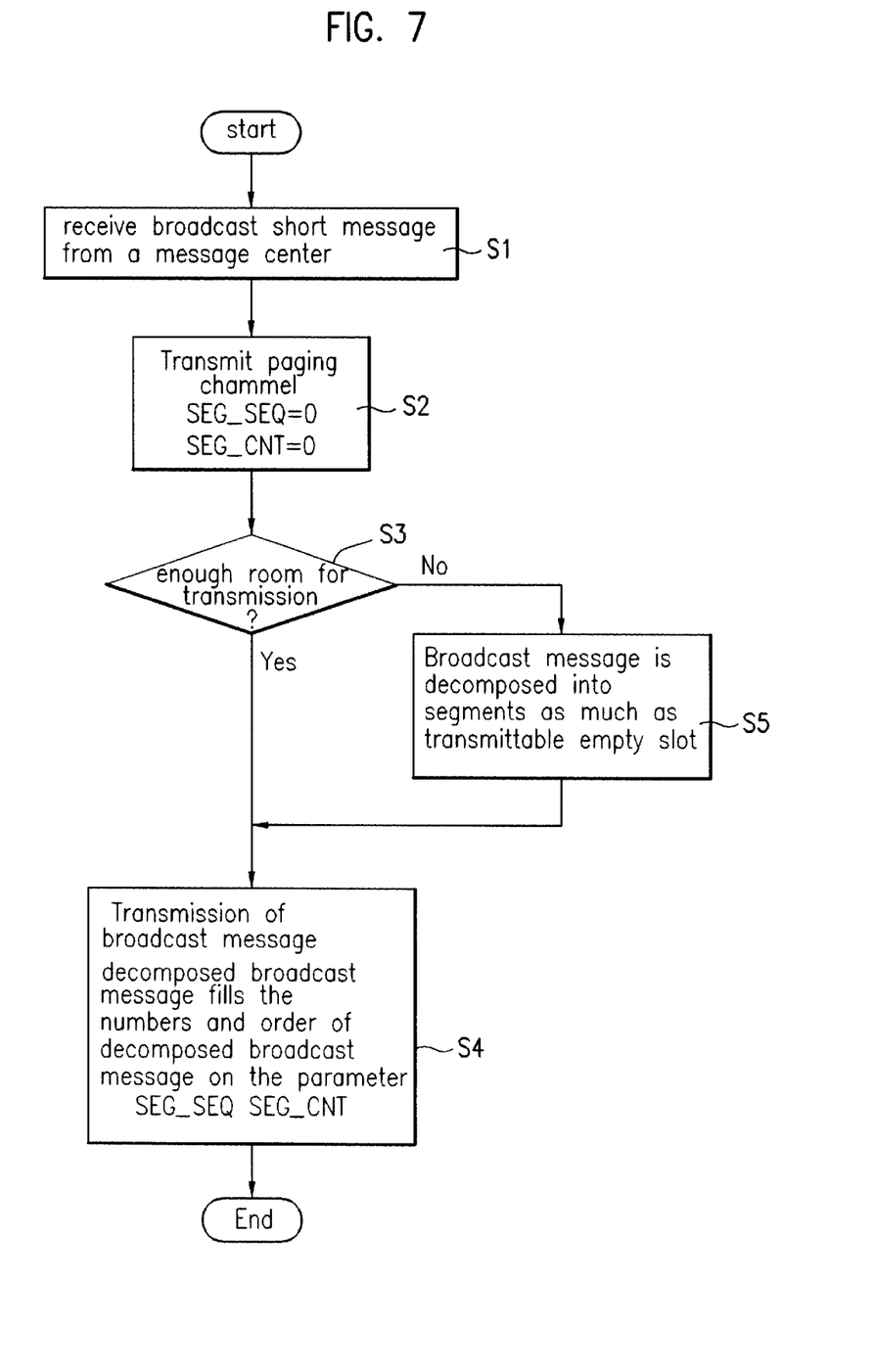
FIG. 7 is a flow chart showing the decomposition process of the broadcast message according to the present invention.

FIG. 7 is a flow chart showing the process for decomposing the broadcast message in the base station.

Before the detailed exemplary embodiment according to the present invention is explained, the process for transmitting and receiving the broadcast message according to the method of the present invention is briefly introduced.

First, a general page message including the broadcast pages is loaded within the first slot of the broadcast paging cycle and then is transmitted from the base station to the mobile station. After then, the remaining messages are successively transmitted.

If the first broadcast message is decomposed into three smaller broadcast messages, the base station transmits the three burst messages to the mobile station.

Each data burst message is transmitted within its broadcast slot concerned.

If the mobile station is configured so as to receive the broadcast message, the mobile station monitors the allocated paging channel slots.

If the mobile station receives the decomposed broadcast messages and the received broadcast message is not the last one, the mobile station stores the received broadcast message in a temporary buffer and waits the last broadcast message.

After the mobile station receives the last broadcast message, the mobile station merges all the received data and sends the signal (RL-DATA) including a parameter (CHARi fields) to the transport layer.

Hence, based on the explanation above, one embodiment according to the present invention is explained.

The base station (4) of FIG. 1 receives the broadcast short message from the cell broadcast center (8) by the primitive type shown in FIG. 3. The base station (4) transmits the received broadcast short message to the paging channel. At this time, the parameter (SEG-CNT) is filled with the number 0. After then, on the paging channel, it is checked whether or not the parameter (SEG-CNT) is filled with the number less than or equal to three. If the parameter (SEG-CNT) is filled with the number larger than three, the broadcast short message is sent to the mobile station (4) by the traffic channel. If the parameter (SEG-CNT) is filled with the number less than or equal to three, it is checked whether or not there is a sufficient space on the paging channel for transmitting all the current broadcast messages. If there is a sufficient space on the paging channel, the base station(3) transmits the broadcast short message to the mobile station through the paging channel. If the space is not enough, the single broadcast message is decomposed into maximum three segments which can be processed by the paging channel according to the message length. After then, the step for checking the number of the segmentation count parameter (SEG-CNT) is performed. On the other hand, if the broadcast message being transmitted by the base station (4) matches the size of the single slot on the paging channel, in other words, if the broadcast short message is not decomposed, the segmentation count parameter (SEG-CNT) is filled with zero. However, if the broadcast short message is decomposed, the segmentation count parameter (SEG-CNT) is filled with the same number as the decomposed message segments when the broadcast short message is decomposed. For example, if the broadcast short message is decomposed into three segments, the segmentation count parameter (SEG-CNT) is filled with three. The detailed explanation for the process that the base station receives the broadcast short message from the cell broadcast center (7) is explained as follows. In the primitive types for the relay layer (30 and the transport layer (20) in FIG. 3, by using the indication primitive for the relay layer broadcasting data, the broadcast short message is transmitted to the transport layer (20) of FIG. 3. However, as described beforehand, if the size of the broadcast short message is too large to be transmitted by a single slot on the corresponding paging channel, the base station (4) decomposes and then transmits the short broadcast message.

On this occasion, the short broadcast message which is included into the character field (CHAR FIELD) of the data burst messages to be transmitted by the paging channel and is transmitted can be decomposed into maximum three segments according to the length of the message and the load quantity of the paging channel.

When the decomposed broadcast messages are included in the data burst message, the segmentation sequence parameter (SEG-SEQ) is filled with the numbers one to three in sequentially increasing order.

In other words, when the short broadcast message is decomposed, the parameter (SEG-SEQ) is filled in the sequence of the decomposed messages. Therefore, when the short broadcast message is not decomposed, the parameter (SEG-SEQ) is filled with the number 0. However, when the other parameter (SEG-CNT) is filled with the total number of the decomposed messages that are not zero, the number 0 which fills the parameter (SEG-SEQ) does not mean that the short broadcast message is not decomposed.

Figure 8:
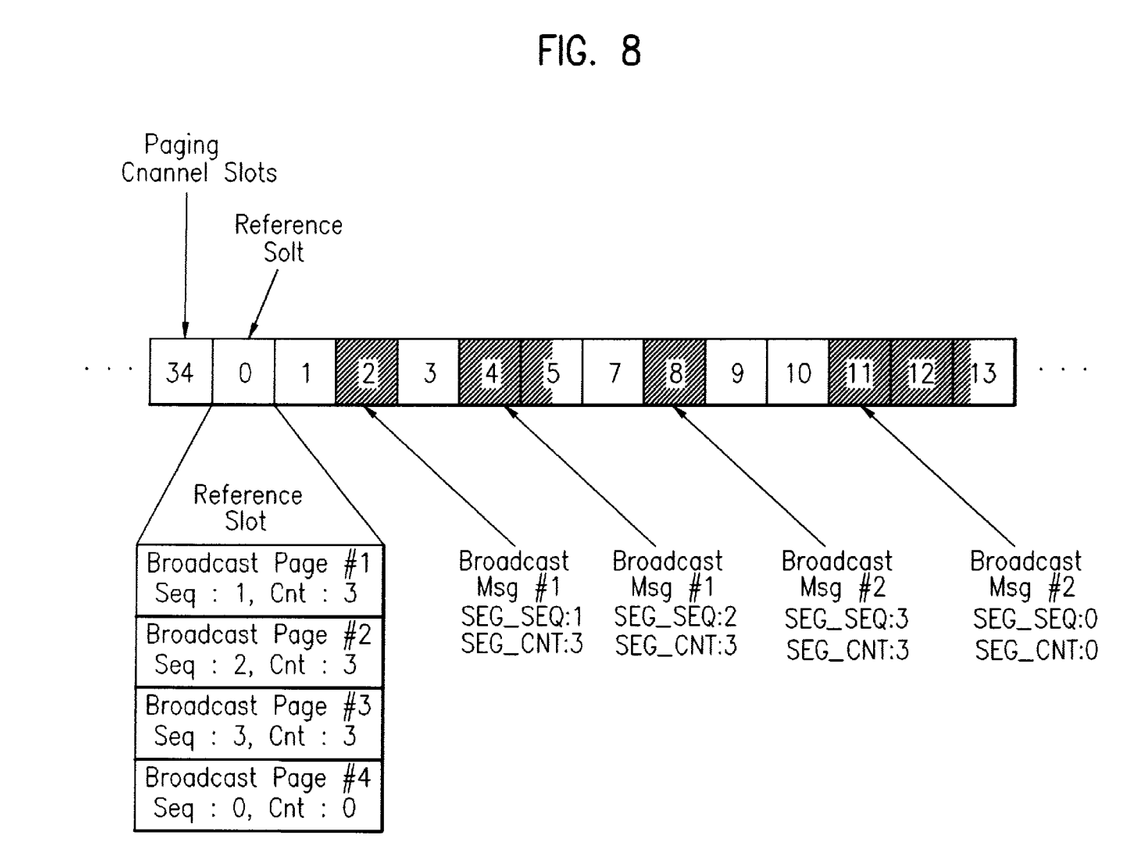
FIG. 8 is a diagram showing the exemplary of transmitting the decomposed broadcast messages according to the present invention in the periodic broadcast paging method.

FIG. 8 is a diagram showing an exemplary embodiment for transmitting the decomposed broadcast message. In FIG. 8, the numeral 34 indicates the number of slots of the paging channel. Four broadcast addresses are included in the zeroth slot, that is, the reference slot. The first broadcast message is decomposed into three small messages. Therefore, the number of the practical broadcast is two. FIG. 8 also shows the example in which the first broadcast message is transmitted after being decomposed into three messages and the second broadcast is transmitted without being decomposed. In other words, the first broadcast message is decomposed into three messages having a proper size in consideration of the transmission load.

Furthermore, the first segment sequence parameter (SEG_SEQ) is filled with one. The second segment sequence parameter (SEG_SEQ) is filled with two. The third segment sequence parameter (SEG_SEQ) is filled with three. The segment count parameter (SEG_CNT) is also filled with three. They are transmitted to a mobile station after filling the corresponding slots, respectively. The second broadcast message is transmitted without being decomposed because the space for transmission is sufficiently secured. In other words, the segment sequence parameter (SEG_SEQ) is filled with zero and the segment count parameter (SEG_CNT) is also filled with zero. This means that the broadcast message is not decomposed.

As described beforehand, when a single broadcast message is transmitted after being decomposed into more than one messages, ie., two or three, each of the decomposed messages has its own broadcast address different from each other and the segment count parameter (SEG-CNT) is filled the total number of the decomposed messages. The segment sequence parameters (SEG_SEQ)s whose number is equal to the number included in the segment count parameter (SEG_CNT) are filled with one, two or three according to the decomposed order). Therefore, the broadcast addresses of the decomposed broadcast messages whose number is equal to the decomposition number are transmitted to the reference slot.

The operation procedure of the receiving mobile station (or terminal) is explained as follows.

The mobile station (4) which can receive the broadcast messages watches the paging channel that is its own control channel. The mobile station (4) receives the general page message including the broadcast addresses by the reference slot for the broadcast messages. After then, among the broadcast addresses included in the general page message, the mobile station selects the broadcast address corresponding to the broadcast service that is supposed to be received by the mobile station user. The mobile station (4) makes a decision on receiving the broadcast message and then receives the broadcast message having the selected broadcast address. The broadcast message corresponding to the broadcast address received in the reference slot can be received from the slot having the relation to the order (n) of the broadcast address after the reference slot.

When the decomposition number included in the segment count parameter (SEG-CNT) of the broadcast address of the received broadcast message is higher than zero, the mobile station decides that a single broadcast message is decomposed by the decomposition number included in the segment count parameter (SEG_CNT). Then, the mobile station stores the received decomposed broadcast messages in the temporary buffer and continues receiving the remaining decomposed broadcast messages. If SEG_CNT and SEG_SEQ are not zero, respectively, and the broadcast messages having the same value are received, the mobile station decides that the last broadcast message among the decomposed broadcast messages is received. Therefore, the mobile station forms a single broadcast message by merging the last received broadcast message and the decomposed broadcast messages stored in the temporary buffer or the decomposed broadcast messages and then transmits the result to the transport layer through the RL-DATA Indication primitive.

If the mobile station does not receive all the decomposed messages by the end of next broadcast period, the mobile station dismisses the decomposed broadcast messages stored in the temporary buffer. Furthermore, if the parameter MESSAGE_ID in the broadcast address of the received broadcast message the mobile station is identical to the parameter MESSAGE_ID included in the broadcast address of the previously received broadcast message, the mobile station in the conventional techniques recognizes the received message as a duplicated message and dismisses the latter received message. However, according to the present invention, if SEG_CNT and SEG_SEQ are different even though the MESSAGE_IDs are identical, the received broadcast messages are different from each other and are received by the mobile station.

According to the present invention, the following effects are obtained.

First, the high quality of the basic communication service is secured and at the same time, the short message broadcast service is possible.

Second, the transmission of the broadcast message longer than the existing short message broadcast service is possible. Therefore, the more information in the existing traffic service can be provided.

Third, the utility efficiency of the limited paging channel is increased.

What is claimed is:

1. A broadcast message transmitting method of a communication system, comprising:

decomposing a broadcast message having a single broadcast address according to the load of a paging channel into a predetermined number of decomposed messages, each of which has an address different from each other;

successively transmitting said predetermined number of the decomposed broadcast messages to a mobile station by said channel;

successively receiving all said decomposed broadcast messages through the mobile station; and forming a single broadcast message by arranging the received decomposed broadcast messages, wherein said decomposing said broadcast message into a predetermined number of decomposed messages further comprises confirming whether a segment count field parameter is filled with the predetermined number that is less than or equal to a previously established maximum number;

if said predetermined number is less than or equal to the previously established maximum number, confirming whether there is a sufficient space on said paging channel for transmitting said broadcast message;

when the space is not sufficient, decomposing said broadcast message by said predetermined number; and filling the segment count field parameter of the broadcast address of each decomposed message with said predetermined number, and filling a segment sequence parameter of the broadcast address of said each decomposed message with a number from a previously established minimum value to the previously established maximum value according to a decomposed order.

2. A broadcast message transmitting method of a communication system claimed in claim 1, further comprising dismissing the decomposed broadcast messages when the mobile station does not successively receive the decomposed broadcast messages.

3. A broadcast message transmitting method of a communication system claimed in claim 1, wherein said broadcast message is decomposed according to a size of said broadcast message as well as a load capacity of said paging channel.

4. A broadcast message transmitting method of a communication system claimed in claim 3, wherein said broadcast message is decomposed into maximum three segments and then transmitted.

5. A broadcast message transmitting method of a communication system claimed in claim 1, wherein said paging channel is the paging channel of said communication system.

6. A broadcast message transmitting method of a communication system claimed in claim 1, further comprising transmitting said broadcast message without decomposing to said mobile station through said paging channel when the number stored in said segment count field parameter is higher than said maximum number.

7. A broadcast message transmitting method of a communication system claimed in claim 1, further comprising transmitting said broadcast message without decomposing to said mobile station through said paging channel when said sufficient space is secured for transmitting.

8. A broadcast message transmitting method of a communication system claimed in claim 1, wherein said maximum number is three and said minimum number is one.

9. A broadcast message transmitting method of a communication system claimed in claim 1, wherein when said broadcast message is not decomposed, both said segment count field parameter and said segment sequence parameter are filled with zero.

10. A broadcast message transmitting method of a communication system claimed in claim 1, further comprising filling said segment sequence parameter of said each decomposed message with zero without modifying said segment count field parameter of said decomposed broadcast messages in order for the broadcast address of each decomposed message to have a same broadcast address and then to be delivered to said mobile station through a reference slot.

11. A broadcast message receiving method of a mobile station comprising:

preparing a control channel to secure a reference slot for a broadcast message transmitted from a transmitting station;

receiving said broadcast message according to a segment count parameter and a segment sequence parameter which are included in a broadcast address of a general page message transmitted through said reference slot and deciding a location of said broadcast message, wherein said segment count parameter is filled with a decomposition number of said broadcast message and said segment sequence parameter is filled with a number from a minimum value to a maximum value according to a decomposition order;

deciding whether said received broadcast message is decomposed by a predetermined number when the decomposition number of said segment count parameter is not zero;

if the decomposition of said broadcast message is confirmed, receiving decomposed broadcast message segments of the broadcast message according to said general page message until said decomposition number stored in said segment count parameter is equal to or less than zero; and when all said decomposed broadcast message segments are received, forming a single broadcast message by arranging said received decomposed broadcast message segments.

12. A broadcast message receiving method of a mobile station claimed in claim 11, wherein said maximum value is three and said minimum value is one.

13. A broadcast message receiving method of a mobile station claimed in claim 11, further comprising:

deciding if a next broadcast address of a next broadcast message presently received by the mobile station is different from the number stored in said segment sequence parameter even though said next broadcast address is the same as two parameters included in the broadcast address of the broadcast message, wherein the two parameters are a first parameter for avoiding the duplicate of the broadcast message and a second parameter for classifying the transmission service of the broadcast message, the next broadcast message is not a duplicate; and accepting the next broadcast message.

14. A broadcast message receiving method of a mobile station claimed in claim 11, further comprising:

storing all messages previously received by said mobile station in a temporary buffer, if a number of said decomposed broadcast message segments previously received by said transmitting station is not as high as the decomposition number of said segment count parameter; and receiving remaining broadcast message segments of said decomposed broadcast message.

15. A method for transmitting messages, comprising:

decomposing a message having a single broadcast address into a predetermined number of decomposed messages, each of the decomposed messages having an address different from others;

transmitting the decomposed messages to a mobile station by a paging channel;

receiving the decomposed messages through the mobile station; and forming a single message by arranging the received decomposed messages, wherein said decomposing said broadcast message into a predetermined number of decomposed messages further comprises confirming whether a segment count field parameter is filled with the predetermined number that is less than or equal to a previously established maximum number;

if said predetermined number is less than or equal to the previously established maximum number, confirming whether there is a sufficient space on said paging channel for transmitting said broadcast message;

when the space is not sufficient, decomposing said broadcast message by said predetermined number; and filling the segment count field parameter of the broadcast address of each decomposed message with said predetermined number, and filling a segment sequence parameter of the broadcast address of said each decomposed message with a number from a previously established minimum value to the previously established maximum value according to a decomposed order.

16. A method for transmitting and receiving messages, comprising:

decomposing a broadcast message into a predetermined number of segments;

transmitting the segments and a general page message including the predetermined number through a paging channel;

receiving the segments based on the predetermined number according to a segment count parameter and a segment sequence parameter which are included in a broadcast address of the general page message transmitted through a reference slot and determining a location of the broadcast message, wherein the segment count parameter is filled with a decomposition number of the broadcast message and the segment sequence parameter is filled with a number from a minimum value to a maximum value according to a decomposition order; and forming the broadcast message by arranging the received segments when all decomposed broadcast message segments are received.

17. A method for receiving messages, comprising:

preparing a control channel to secure a reference slot for a transmitted message;

receiving the transmitted message according to a segment count parameter and a segment sequence parameter which are included in a broadcast address of the general page message transmitted through a reference slot and determining a location of the broadcast message, wherein the segment count parameter is filled with a decomposition number of the broadcast message and the segment sequence parameter is filled with a number from a minimum value to a maximum value according to a decomposition order;

determining if the received message is decomposed into a predetermined number of segments;

receiving remaining segments based on the predetermined number included in the general page message, if the message is decomposed; and forming a single message by arranging received segments when the predetermined number is satisfied.

18. The method of claim 11, wherein deciding the location of said each decomposed broadcast message comprises:

when n is an order of the broadcast addresses and a number of a SEG-CNT is the same as the number of said segment count parameter, calculating a value n1 by executing an equation n1=n1+(SEG-CNT−1),where the minimum decomposition number <SEG-CNT< the maximum decomposition number; and evaluating the location of each message by multiplying said value n1 and said maximum decomposition number.

19. The method of claim 18, wherein said maximum decomposition number is three and said minimum decomposition number is one.

20. The method of claim 16, wherein decomposing the broadcast message into the predetermined number of decomposed messages comprises:

confirming whether a segment count field parameter is filled with the predetermined number that is less than or equal to a previously established maximum number;

if the predetermined number is less than or equal to the previously established maximum number, confirming whether there is a sufficient space on said paging channel for transmitting said broadcast message;

when the space is not sufficient, decomposing the broadcast message by the predetermined number; and filling the segment count field parameter of the broadcast address of each decomposed message with the predetermined number, and filling a segment sequence parameter of the broadcast address of each decomposed message with a number from a previously established minimum value to the previously established maximum value according to a decomposed order.

* * * * *